July 24, 1956

J. H. LITTLE 2,755,726

HEATING AND DEFROSTING APPARATUS

Filed March 15, 1952

INVENTOR.
John H. Little
BY
Willits, Helmig & Baillio
ATTORNEYS

July 24, 1956     J. H. LITTLE     2,755,726
HEATING AND DEFROSTING APPARATUS
Filed March 15, 1952     6 Sheets-Sheet 2

INVENTOR.
John H. Little
BY
*Willit, Helmig & Baillio*
ATTORNEYS

July 24, 1956

J. H. LITTLE 2,755,726

HEATING AND DEFROSTING APPARATUS

Filed March 15, 1952

INVENTOR.
John H. Little
BY
Willits, Helwig & Bailles
ATTORNEYS

July 24, 1956 J. H. LITTLE 2,755,726
HEATING AND DEFROSTING APPARATUS
Filed March 15, 1952 6 Sheets-Sheet 4

INVENTOR.
John H. Little
BY
Willits, Helwig & Bailie
ATTORNEYS

July 24, 1956   J. H. LITTLE   2,755,726
HEATING AND DEFROSTING APPARATUS
Filed March 15, 1952   6 Sheets-Sheet 5

INVENTOR.
John H. Little
BY
Willits Helmig & Baillio
ATTORNEYS

July 24, 1956

J. H. LITTLE 2,755,726

HEATING AND DEFROSTING APPARATUS

Filed March 15, 1952

INVENTOR.
John H. Little
BY
Willis, Helmig & Baillie
ATTORNEYS

United States Patent Office 2,755,726
Patented July 24, 1956

2,755,726
HEATING AND DEFROSTING APPARATUS

John H. Little, Huntington Woods, Mich., assignor to General Motors Corporation, Detroit, Mich., a corporation of Delaware Application March 15, 1952, Serial No. 276,807

6 Claims. (Cl. 98—2)

This invention relates to heating, ventilating, and defrosting apparatus, and more particularly to heating, ventilating, and defrosting apparatus employed on motor vehicles.

In automotive vehicles it is desirable to have associated therewith heating, ventilating, and defrosting apparatus which enables proper heating and ventilating of the passenger compartment thereof to suit the requirements of the occupants under all weather conditions. During the winter months it is desirable at times to recirculate the air within the vehicle in order to rapidly increase the temperature thereof as rapidly as possible. After the temperature has been increased to the desirable value, it may be desirable to circulate heated fresh air through the vehicle. On the other hand, during warm weather it is extremely desirable to permit outside air to circulate freely through the vehicle. In apparatus of this type it is also important that the speed at which air is circulated through the vehicle passenger compartment be regulated. Apparatus of this general type employed heretofore contains some of the above mentioned features but most of such devices fail to provide control means which enable all of these various functions to be readily performed.

One object of the invention is to provide a new and highly useful heating, defrosting, and ventilating apparatus for automotive vehicles which enables the heating and recirculating of air within the vehicle or heating and circulation of fresh air drawn into the system from outside said vehicle.

Another object is to provide in heating, ventilating, and windshield defrosting apparatus of the stated character, a novel control mechanism which affords a plurality of speeds of operation of the blower for both recirculating the air within the vehicle and for circulating of fresh air drawn into the system from outside the vehicle.

A further object is to provide a novel and simplified control mechanism including a plurality of closures, the closures being so constructed and arranged with respect to the operating mechanism that when said operating mechanism is in one position the closure controlling the outside air is closed, while the closure controlling the recirculation of air within the vehicle is open thereby permitting the recirculation of air within the vehicle, when in a second position said first mentioned closure is opened while said second mentioned closure is closed thereby permitting the circulation of fresh air drawn from outside said vehicle, and when said operating mechanism is in a third position both of the said closures are open thereby permitting fresh air to flow directly into the vehicle.

A still further object is to provide a compact and highly efficient apparatus for heating, ventilating, and windshield defrosting purposes which is simple in construction, economic in manufacture, and highly efficient in operation.

Other and further objects will become apparent as the description of the invention progresses.

Referring to the drawings, the numeral 2 designates generally an automotive vehicle having an engine compartment 4 and a passenger compartment 6. The engine compartment 4 has mounted therein the usual internal combustion engine designated generally at 8 having a coolant jacket 10 through which a coolant may be circulated by means of a pump 12. An air inlet duct 14 of any suitable construction extends from the front end 16 of the vehicle to the dash panel 18 which separates the engine and passenger compartments of the vehicle. A windshield indicated generally at 20 extends upwardly and rearwardly from the cowl 22 of the vehicle.

Figures 1, 2:
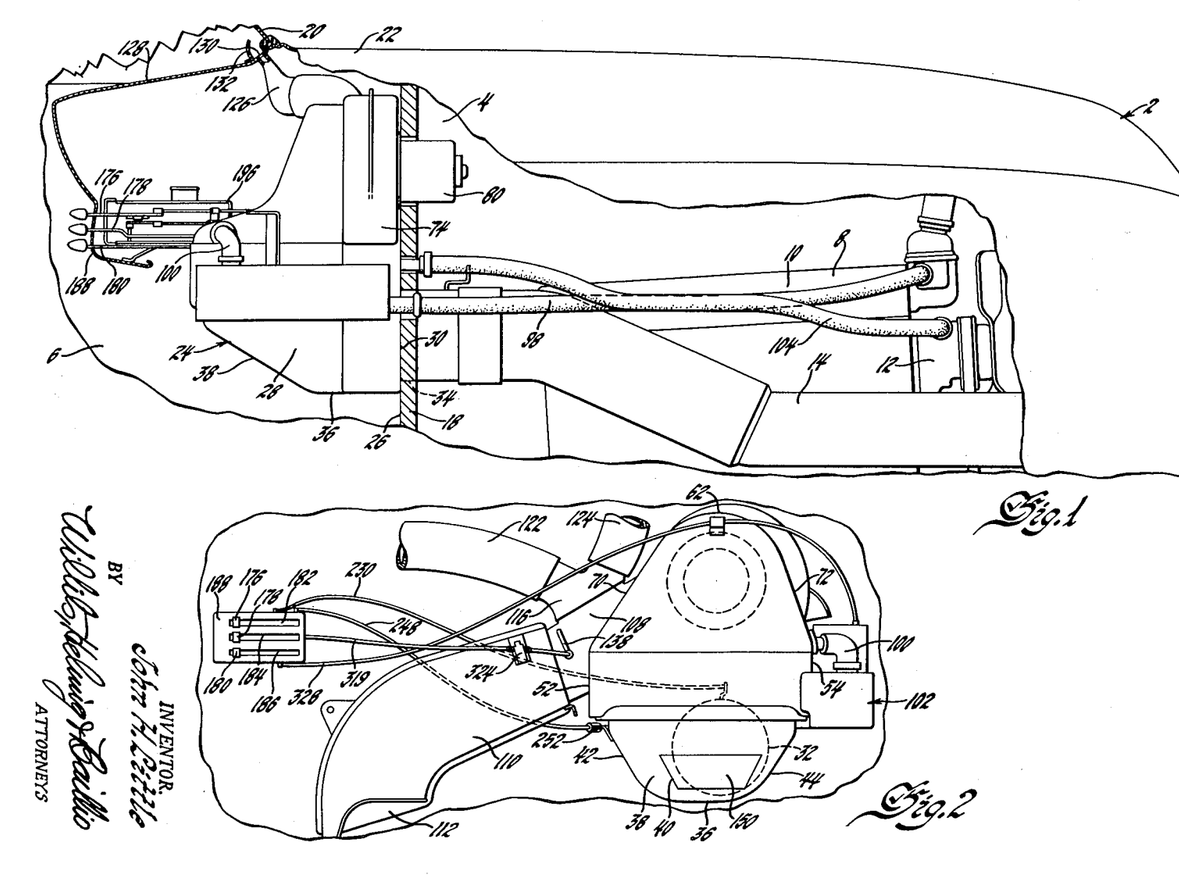
Fig. 1 is a side elevational view, partly in section, of a portion of the front end of an automotive vehicle, showing the arrangement of the various elements of the heating, ventilating, and defrosting apparatus comprising the present invention.
Fig. 2 is a front elevational view of the heating, ventilating, and windshield defrosting apparatus looking toward the dash panel from within the passenger compartment of the vehicle.
Figure 7:
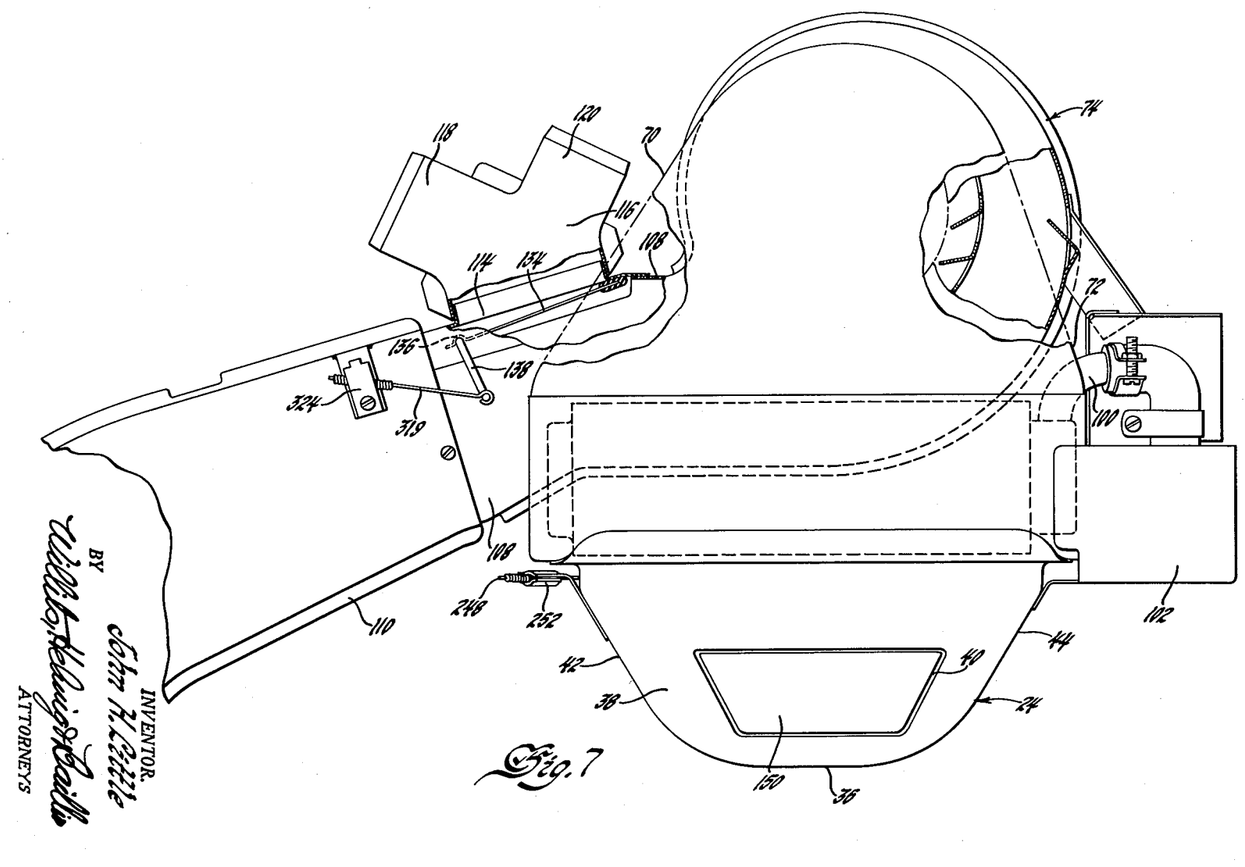
Fig. 7 is an enlarged front elevational view of the heating, ventilating and defrosting apparatus, parts thereof being shown in section and other parts being removed to more clearly show certain features thereof.
Figure 8:
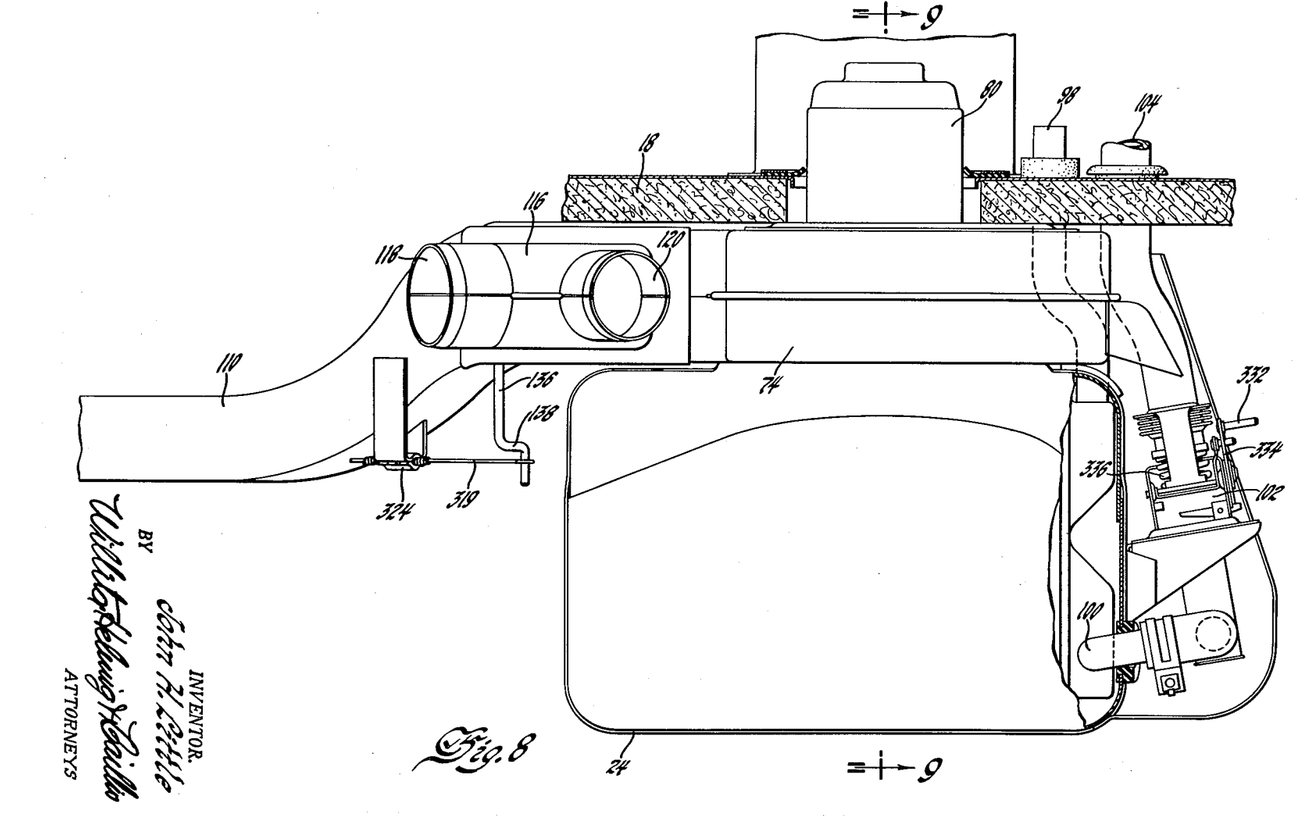
Fig. 8 is a plan view, partly in section, of the apparatus shown in Fig. 7 parts thereof being broken away to more clearly show certain features thereof.
Figure 9:
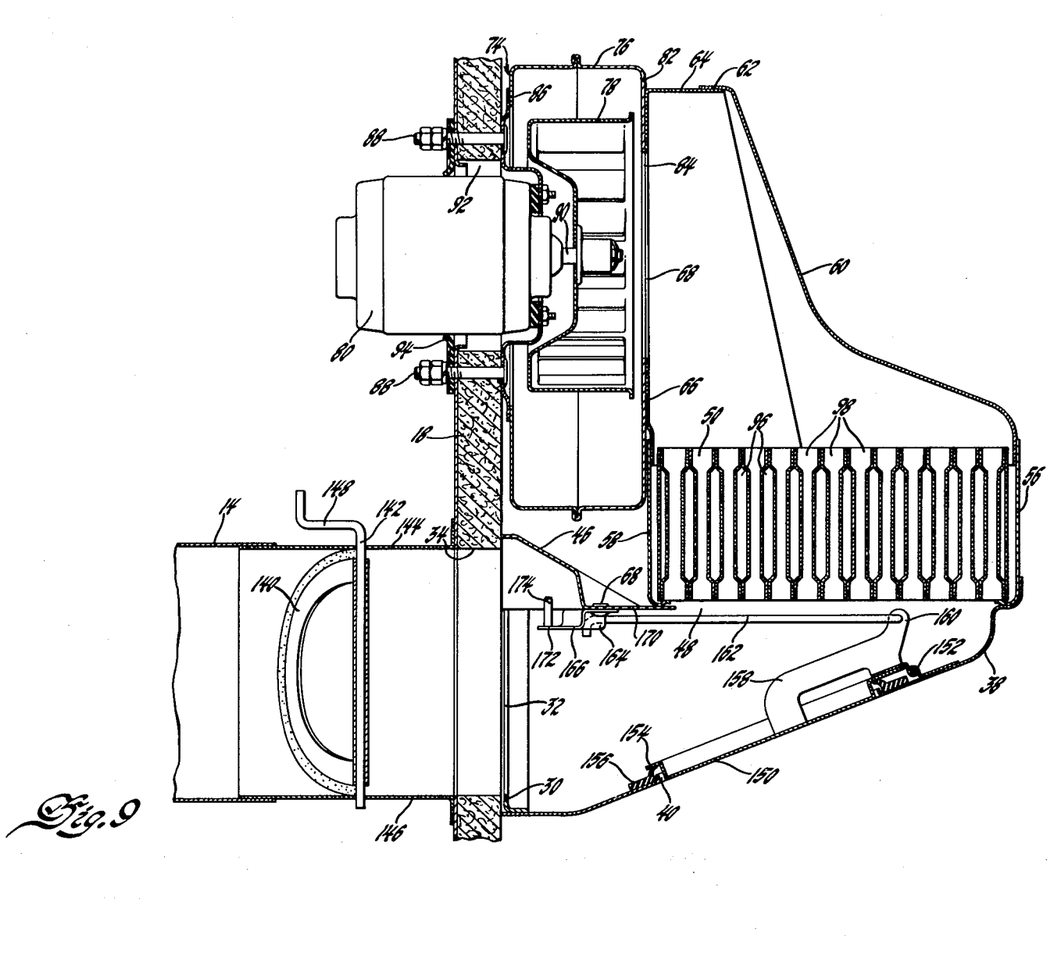
Fig. 9 is an enlarged sectional elevational view taken substantially along line 9—9 of Fig. 8.

The heating, ventilating, and windshield defrosting unit is indicated generally at 24 and is secured by bolts or any other suitable means to the inner surface 26 of dash panel 18. Unit 24 comprises a casing 28 having a front wall 30 which lies in abutting relation with the inner surface of dash panel 18. Front wall 30 is provided with a circular opening 32 near the lower end thereof which registers with a corresponding opening 34 provided in dash panel 18. The inner end of duct 14 is secured to the outer side of dash panel 18 as shown in Fig. 9 and communicates with openings 34 and 32. Fresh air is thus conducted by duct 14 to the interior of casing 28. Casing 28 is provided with a flat bottom wall 36 which terminates at its rearwardly disposed end in an upwardly inclined wall 38 having a rectangular opening 40 provided therein. Walls 30, 36, and 38 are connected by upwardly and outwardly extending side walls 42 and 44. A downwardly inclining irregularly shaped wall 46 (Fig. 9) extends between side walls 42 and 44 and across the top of rear wall 30. Wall 46 extends only a short distance rearwardly of front wall 30 forming an enlarged opening 48 through which air entering casing 28 either through duct 14 or opening 40 in inclined wall 38 may pass. Immediately above inclined wall 38 and side walls 42 and 44 and extending above opening 48 is a cellular type heating core 50. Core 50 is enclosed by side walls 52 and 54, front wall 58, and rear wall 56 which are secured in any suitable fashion to and extend upwardly from walls 38, 42, 44, and 46. Secured to and extending upwardly from wall 56 is an irregular shaped, forwardly and upwardly inclined wall member 60 which terminates at its upper end in a substantially horizontal portion 62 which overlaps and is secured to the curved top wall 64 of the casing. A rear wall extension 66 having an enlarged opening 68 therein is secured to and extends upwardly from wall 58 and may be integral with top wall 64 or secured thereto by any suitable means. Walls 60, 66, and 64 are connected by upwardly converging side walls 70 and 72 (Figs. 2 and 7).

A blower mechanism indicated generally at 74 and consisting of a casing 76 and a blower 78 driven by an electric motor 80 is secured to dash panel 18. As shown more particularly in Fig. 9, the rearwardly disposed wall 82 of casing 76 is provided with an enlarged opening 84 which registers with opening 68 provided in wall 66. The front wall 86 of casing 76 is secured by means of through bolts 88 to dash panel 18. The motor 80 is coupled by means of a shaft 90 to blower 78 and extends forwardly through an opening 92 provided in dash panel 18 above the air inlet opening 34. A resilient seal 94 engages the periphery of the casing of motor 80 and acts as a seal to prevent air in the engine compartment 4 from entering the circulating system.

Heating core 50 may be of any suitable construction and comprises a series of coolant circulating tubes 96 having disposed in heat conducting relation therewith fin means 98 between which the air flowing through the system may pass. The heating core 50 is connected to the jacket 10 of engine 8 by means of a flexible pipe connection 98. A second pipe connection 100 connects the other side of core 50 with a thermostatically controlled valve mechanism indicated generally at 102 which in turn is connected by means of a flexible return pipe connection 104 to the circulating pump 12 attached to engine 8. Thus, when the control valve associated with thermostatically controlled valve apparatus 102 is open, heated liquid from engine jacket 10 will flow through heating core 50 and be returned to pump 12 through valve structure 102 and return pipe connection 104. The heat conducted to the tubes 96 and fins 98 by the heating liquid is dissipated by the air passing between the said fins. Air to be heated and circulated through the system, as pointed out hereinbefore, may be drawn from the outside through duct 14 or it may be drawn from within the passenger compartment.

The discharge end 108 of blower mechanism 74 has attached thereto a duct 110 which conducts the air to a discharge opening 112 disposed midway between the sides of the vehicle and forwardly of the front seat thereof. The discharge end 108 of blower 74 has provided at the upper end thereof a defroster take-off opening 114 having a dual outlet fitting 116 connected thereto. The outlet ends 118 and 120 of fitting 116 are connected in the usual manner by flexible pipe connections 122 and 124 to nozzle members 126 secured in any suitable manner beneath the upper panel 128 provided in passenger compartment 6 directly rearwardly of the lower end of windshield 20. The discharge ends of nozzles 126 communicate with openings 130 provided at the forwardly disposed end of panel 128 and baffles 132 are provided to direct the air upwardly against the interior of windshield 20.

A valve 134 pivoted at 136 to the discharge end 108 of blower 74 is adapted to close opening 114 when in the position shown in Fig. 7. Valve 134 is adapted to be swung in a clockwise direction about its pivot 136 to close the discharge end of fitting 108 and thereby prevent the flow of air into duct 110. When in the position shown in Fig. 7 substantially all of the air from the blower will flow into duct 110. However, when the valve 134 is swung into its lower position of adjustment all of the air will be directed upwardly through opening 114 for windshield defrosting purposes. When the valve 134 is in an intermediate position the air discharging from blower 74 is apportioned between take-off opening 114 and duct 110. Valve 134 has attached to the pivot 136 thereof a crank arm 138 to which is operatively connected a mechanism for adjusting the latter which will be described later herein.

In order to control the flow of fresh air into the unit 24, a valve 140 is provided in duct 14 near the discharge end thereof. As shown more particularly in Fig. 9, valve 140 is pivotally supported on a rod 142 which is journaled in aligned openings in the upper and lower walls 144 and 146, respectively, of duct 14. Rod 142 is bent to form a crank as shown at 148 by which valve 140 might be adjusted.

Opening 40 provided in inclined wall 38 of casing 28 may be closed by a door 150. Door 150 is pivoted at its upper, rearwardly disposed end on wall 38 of casing 28 as shown at 152, and has an outwardly extending flange 154 provided around the perimeter thereof which is adapted to engage a resilient gasket 156 disposed around the edge of opening 40 to thereby prevent air leakage into the unit when the door is closed. The inner side of door 150 has secured thereto a bracket 158 to the upper arm 160 of which is pivotally connected one end of an operating rod 162. The other end of rod 162 is pivotally connected to the one arm 164 of a two arm lever 166 pivoted, as shown at 168, to the horizontal portion 170 of wall 46. The other arm 172 of lever 166 has secured thereto a pin 174 to which an operating mechanism for door 150 may be attached as will appear more fully later herein.

Figure 3:
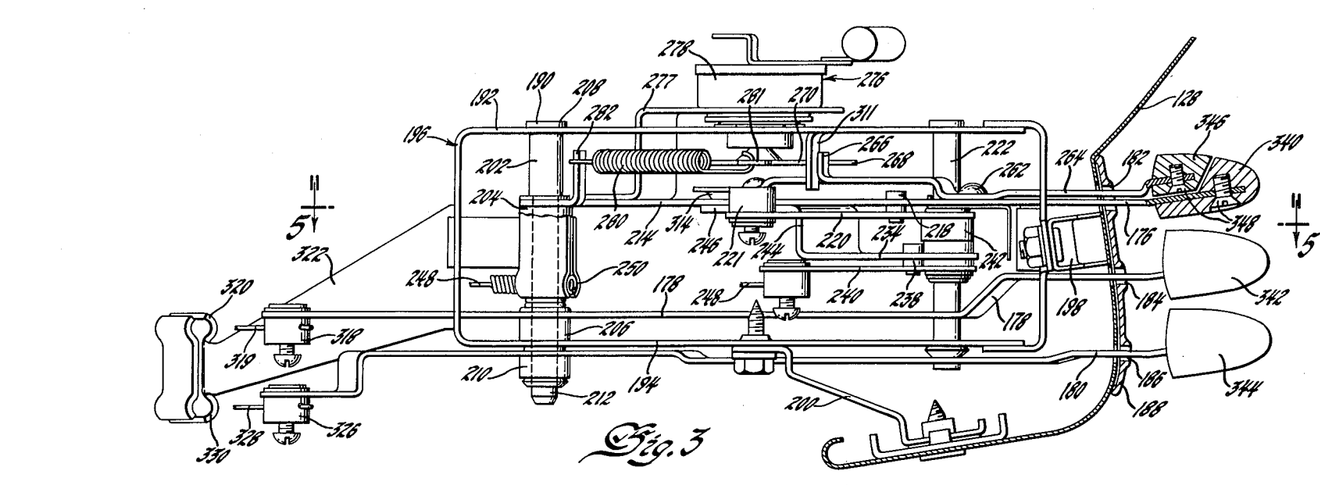
Fig. 3 is a side elevational view, partly in section, showing the structure and arrangement of the various control levers associated with the apparatus.
Figure 6:
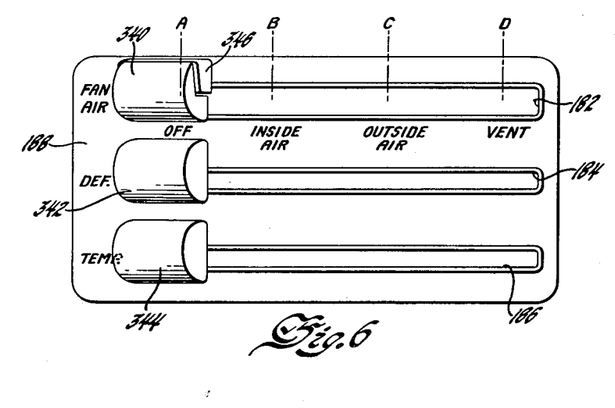
Fig. 6 is a front view of the control levers and the escutcheon guide plate therefor.

As shown more particularly in Figs. 3 and 6, three control levers 176, 178, and 180 are provided for controlling the various valves and control mechanisms associated with the unit 24. The rearwardly disposed ends of levers 176, 178, and 180 extend through and are guided in elongated slots 182, 184, and 186, respectively, provided in a mounting plate 188 secured to the instrument panel 128 within passenger compartment 6. Levers 176, 178, and 180 are pivoted on a pin 190 mounted in the top and bottom walls 192 and 194 of a supporting bracket 196 secured in any suitable manner, such as by brackets 198 and 200 to instrument dash panel 128. A spacing bushing 202 is disposed between levers 176 and the inner surface of bracket wall 192. A second spacing bushing 204 extends between levers 176 and 178. A third spacing bushing 206 is disposed between lever 178 and the inner surface of bottom wall 194. One end of pin 190 is held against axial movement by the head portion 208 thereof while said pin is held against axial movement in the other direction by a nut 210 mounted on the threaded end 212 thereof.

As shown in Fig. 6, lever 176 is adapted for movement to four positions of adjustment. When in the first position indicated A, the circuit to the blower motor 80 is interrupted. When in the position indicated B, the circuit to blower motor 80 is closed and, accordingly, air is induced through the system by the blower mechanism 74. When in positions A and B valve 140 is closed but door 150 is open. Accordingly, when the lever is in B position air from within the vehicle may be recirculated. When lever 176 is moved to the position indicated at C, door 150 is closed while valve 140 is opened thereby permitting fresh air to be drawn through duct 14 and into the unit. The circuit to motor 80 remains closed when in this position and consequently the blower mechanism 74 continues to induce air flow through the system. When lever 176 is moved to the position indicated at D the circuit to motor 80 is interrupted and at the same time door 150 is opened while valve 140 remains in open position. Fresh air, accordingly, is now permitted to flow directly into the vehicle through duct 14 and opening 40.

The connections between lever 176 and the valve 140 and door 150 will now be described in detail. As shown more particularly in Figs. 3 and 4, lever 176 has formed thereon an enlarged portion 214 having a cam slot 216 provided therein which receives a pin cam follower 218 secured to a lever 220 intermediate the ends of the latter. Lever 220 is pivoted at its upper end on a pin 222 extending between and secured in any suitable manner to the top and bottom walls 192 and 194 of bracket 196. Cam slot 216 consists of an upper rest portion 224, an intermediate cam portion 226, and a lower rest portion 228. The lower end of lever 220 has secured thereto a bracket 221 to which one end of a Bowden cable 230 is attached. Bowden cable 230 is mounted for reciprocation in a bracket 232 secured in any suitable manner to the supporting frame 196. The other end of cable 230 is connected to the crank arm 148 associated with the valve 140 provided in fresh air duct 14.

Lever 176 has secured thereto in spaced relation with enlarged portion 214 a second enlarged flat member 234 having a cam slot 236 provided therein for receiving a pin cam follower 238 secured intermediate the ends of a second lever 240 also pivotally mounted at one end on pin 222. Levers 220 and 240 are held in spaced relation with each other by spacing bushings 242. As shown in Fig. 3, cam member 234 is provided with an intermediate portion 244 disposed at right angles to the said cam portion thereof and a portion 246 disposed substantially parallel to enlarged portion 214 of lever 176 and secured to the inner side of the latter by welding or by any other suitable means. The lower end of lever 240 has secured thereto one end of a Bowden cable 248 which is mounted for reciprocating movement in a bracket 250 secured in any suitable manner to the frame 196. The other end of cable 248 is connected to the pin 174 secured to operating lever 166 for door 150. A bracket 252 secured to the casing 24 of the heating unit in any suitable manner also supports the cable 248 for reciprocating movement. Cam slot 236 is provided with an upper gradually inclining cam portion 254, a more sharply inclined cam portion 256, a rest portion 258, and a lower sharply inclined cam portion 260. When lever 176 is in position A, the valve 140 in duct 14 is in closed position and the door 150 for opening 40 is in almost fully open position. When lever 176 is moved to the position indicated B, or the inside recirculating position, owing to the rest portion 224 in cam slot 216 valve 140 will remain in closed position. Door 150, however, will be moved partially toward closed position by the operation of portion 254 of cam slot 236 of the pin 238 attached to lever 240. This is done to enable a greater circulation of air around door 150 and through the heating core 50. Upon reference to Fig. 9, it will be observed that when door 150 is raised to its uppermost position it lies close to core 50 and tends to shut off some air flow thereto. However, by moving door 150 downwardly somewhat as is done when the lever 176 moves to the position B, better circulation may be effected around the door 150 and through the heating core 50. When lever 176 is moved to the position indicated C, the cam portion 226 of slot 216 will actuate lever 220 in a counterclockwise direction (Fig. 4) thereby causing Bowden cable 230 to actuate valve 140 to open position. At the same time the cam portion 256 of cam slot 236 will actuate lever 240 in a counterclockwise direction thereby causing door 150 to be actuated by Bowden cable 248 to fully closed position, as shown in Fig. 9. Fresh air will now be circulated through the system. When lever 176 is moved to the position indicated D valve 140 will remain in open position since at this time cam follower 218 will have reached the entrance to the rest portion 228 of cam slot 216. Consequently, no movement will be imparted to valve 140. It is also seen that when lever 176 is moved to the position marked D, the portion 260 of cam slot 236 will actuate lever 240 in a clockwise direction thereby causing door 150 to be actuated by Bowden cable 248 to its fully open position. Fresh air may now flow directly into the vehicle through duct 14 and opening 40, the door 150 acting as a deflector to cause air to be directed through the said opening 40. Lever 176 has pivotally mounted intermediate the ends thereof, as shown at 262, a switch control lever 264. The inner end of lever 264 is provided with a laterally extending projection 266 which is adapted to engage the outwardly extending arm 268 of a three armed switch operating lever 270. Lever 270 has secured thereto a stud 272 to which is operatively connected a movable contact arm 274 of a control switch mechanism indicated generally by the numeral 276. Switch 276 is secured in any suitable manner to a supporting bracket 277 and the contacts and other parts thereof are mounted within any suitable casing indicated at 278. Bracket 277 is welded or otherwise secured to the enlarged portion 214 of lever 176 and consequently switch 276 and its operating lever 270 move therewith during adjustment of said lever to its four positions of adjustment, an enlarged opening 278 being provided in the upper wall 192 of frame 196 for this purpose. A coil spring 280 is connected at one end to a second arm 281 of lever 270 and at the other end to an ear 282 struck out from the enlarged portion 214 of lever 176. Spring 280 is pretensioned so as to swing lever 270 and consequently contact arm 274 to certain positions as will appear fully later herein.

Figure 10:
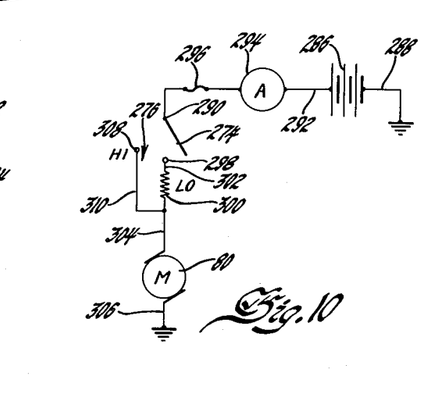
Fig. 10 is a wiring diagram of the electric circuit to the motor for operating the blower of the apparatus.

As shown in Fig. 10, one terminal of an electric battery 286 is connected to ground by a conductor 288 while the other terminal thereof is connected to the central pole 290 of contact arm 274 by a conductor 292, an ammeter 294 and a fuse 296 being connected in series therein. During operation of lever 176 to the positions indicated B and C in Fig. 6, spring 280 operates lever 270 which in turn actuates contact arm 274 into engagement with a fixed contact 298 of switch 276. Contact 298 is connected to one side of a resistance 300 by a conductor 302, the other side of said resistance being connected to one side of motor 80 by a conductor 304. The other side of motor 80 is connected to ground by a conductor 306. Spaced from contact 298 is a second contact 308 which is connected to conductor 304 by a conductor 310. Fig. 10 shows the position of switch arm 274 when lever 176 is in the position A. When lever 176 is moved to this position, a finger 311 struck out from wall 192 of bracket 196 engages arm 268 of switch operating lever 270 causing the latter to move switch arm 274 out of engagement with contact 298, thereby interrupting the circuit to motor 80. Operation of motor 80 therefore cannot take place while lever 176 is in the position indicated A. When lever 176 moves to position B switch operating lever moves away from finger 311 causing spring 280 to swing lever 270 in a clockwise direction (Fig. 4) which in turn actuates switch arm 274 into engagement with contact 298 thereby closing the circuit to motor 80 through resistance 300. Motor 80 now operates at a relatively low speed and induces air flow through the system. In the event that it is desired to increase the speed of operation of blower 78, lever 264 is moved in a counterclockwise direction (Fig. 4) about its pivot 262 relative to lever 176 thereby moving the projection 266 thereon away from the arm 268 of lever 270 causing spring 280 to swing the latter in a clockwise direction to bring switch arm 274 into contact with contact element 308 thereby short circuiting resistance 300. The speed of operation of motor 80 therefore will now be increased correspondingly. In the event that it is desired to interrupt the circuit to motor 80, lever 264 is moved in the opposite direction about its pivot thereby actuating lever 270 in a counterclockwise direction (Fig. 4) to bring switch arm 274 out of engagement with both contacts 308 and 298. When lever 264 is again moved to its normal position in parallel relation with lever 176, spring 280 moves switch arm 274 into contact with contact element 298 and motor 80 will again operate at a reduced speed. Upon movement of lever 176 to the position indicated C the switch arm 274 will remain in contact with contact 298 since it will be remembered that the switch 276 and the associated operating parts are carried by said lever. Therefore if it is desired to increase the speed of motor 80 when lever 176 is in position C, lever 264 is swung in a counterclockwise direction (Fig. 4), and to interrupt the circuit to said motor the said lever 264 is swung in a clockwise direction, causing operation of the parts in the same manner as hereinbefore described when said lever 176 was in position B. When lever 176 is moved to the position indicated D, the third arm 312 of lever 270 is engaged by a second finger 313 struck out from the wall 192 of bracket 196 causing movement of said lever 270 in a counterclockwise direction (Fig. 4), thereby bringing switch arm 274 out of contact with contacts 298 and 308. Operation of motor 80 is thus prevented when lever 176 is in the position D.

Figure 4:
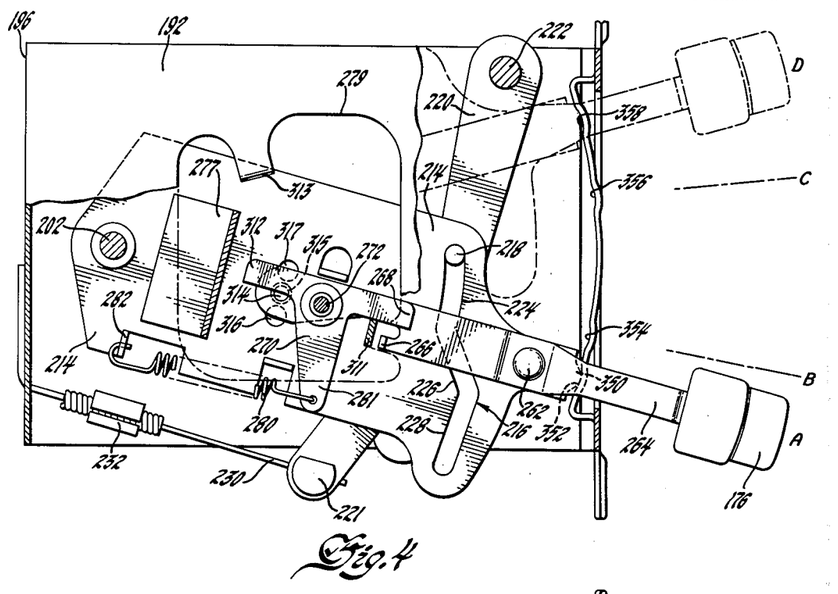
Fig. 4 is a plan view, partly in section, of the control mechanism a portion of the supporting bracket therefor being removed to show one of the control levers for the apparatus and the associated motor control switch operating means.
Figure 5:
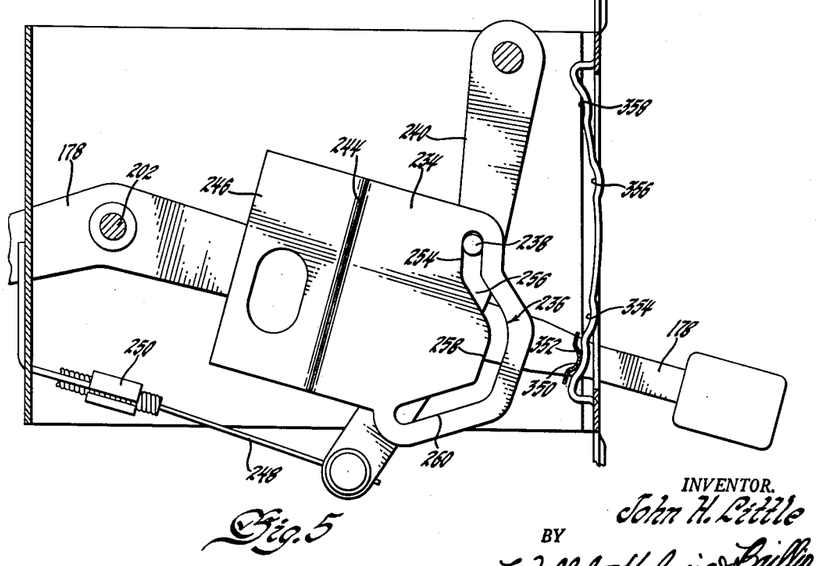
Fig. 5 is a plan view, partly in section, of the control levers associated with the apparatus, said view being taken substantially along line 5—5 of Fig. 3.

In order to retain switch control lever 264 in its three positions of adjustment, a detent 314 is provided at the inner end thereof which as shown in Fig. 4 is adapted to seat in any one of three depressions 315, 316, and 317 provided in enlarged portion 214 of lever 176. Detent 314 seats in central depression 315 when lever 264 is parallel with lever 176, in depression 316 when lever 264 is swung counterclockwise to cause increase in motor speed, and in depression 317 when said lever 264 is swung in a clockwise direction to interrupt the circuit to motor 80. When control lever 176 is in the position indicated D it will be remembered that both valve 140 and door 150 are open and, accordingly, fresh air may flow directly into compartment 6 of the vehicle. This condition is desirable during summer driving when it is desired to ventilate the interior of the vehicle.

Lever 178 is also pivoted on pin 190 and has secured to the outer end thereof a bracket 318 to which one end of a Bowden cable 319 is attached. Cable 319 is mounted for reciprocation in a holding bracket 320 secured by an arm 322 to frame 196. The other end of cable 319 is connected to the outer end of crank arm 138 provided for operating valve 134. The end of Bowden cable adjacent crank arm 138 is mounted for reciprocation in a bracket 324 secured to the outer side of distributing duct 110. Thus by actuating lever 178 in one direction damper 134 will be swung about its pivot in a clockwise direction (Fig. 6) thereby uncovering defroster take-off opening 114 provided at the upper end of blower outlet 108. When lever 178 is actuated in the reverse direction valve 134 is actuated in a counterclockwise direction towards opening 114. Lever 180, as pointed out hereinbefore, is also pivotally mounted on pin 190 and has a bracket 326 secured to the outer end thereof to which one end of a Bowden cable 328 is operatively connected. Bowden cable 328 is mounted for reciprocating movement in a holding bracket 330 disposed opposite to previously described bracket 320. The other end of cable 328 is secured to a pin 332 attached to the upper end of a lever 334 for adjusting the thermostatic valve structure 102. When lever 180 is moved in one direction the valve associated with structure 102 is moved toward open position and the spring mechanism indicated generally at 336 is so adjusted as to oppose a greater load on the thermostat tending to close the said valve. When the lever is moved in the opposite direction the tension on the spring 336 is reduced and the valve is actuated toward closed position thereby permitting less heating fluid to circulate through the heating core 50. Thermostatic devices and the means for adjusting them are well known in the art and for a complete description of such a mechanism reference may be had to the copending application of Rodney M. Johnston, Serial No. 219,655, filed April 6, 1951.

From the foregoing disclosure the operation of the apparatus is believed to be apparent. However, in order to correlate the various elements thereof, a brief resume of the operation of the device as a whole will now be given.

Referring to Fig. 6, the levers 176, 178, and 180 are normally moved to their extreme left-hand position. When in this position valve 140 is closed, door 150 is open, and the electric circuit to motor 80 is open. Valve 134, also, is in its upper position as shown in Fig. 7. In order to condition the apparatus for recirculation of air, lever 176 is moved to the position indicated B. This causes switch arm 274 to engage fixed contact 298 thereby closing the circuit to motor 80 through resistance 300. Motor 80 will now drive blower 78 at a reduced speed causing the air within the vehicle compartment 6 to pass through opening 40, heating core 50, and thence be directed through distributing duct 110 and be discharged into said compartment through outlet opening 112. Should it be desired to increase the circulation of air, lever 264 is moved in a counterclockwise direction (Fig. 4) about its pivot, thereby enabling spring 280 to move contact arm 274 into engagement with contact 308. Resistance 300 is now short circuited and the speed of motor 80 and blower 78 will be correspondingly increased. Should it be desired to direct a portion or all of the air for windshield defrosting purposes, lever 178 is moved to the right (Fig. 6) thereby moving valve 134 in a clockwise direction (Fig. 7) about its pivot 136. By moving lever 178 fully to the right (Fig. 6) substantially all of the air will be caused to discharge through opening 114 for windshield defrosting purposes. If a portion of the air is desired for windshield defrosting or circulation upwardly along the inside of the windshield and a portion for direct heating purposes, lever 178 is moved to an intermediate position which causes valve 134 to assume an intermediate position permitting a portion of the air to flow through duct 110 and a portion to flow through take-off opening 114. In the event that it is desired to increase the heating effect of core 50 lever 180 is moved toward the right (Fig. 6) thereby tending to move the thermostatically operable valve 102 toward open position. This causes a greater amount of heating fluid to circulate through the heating core 50 which obviously increases the heating effect thereof.

Should it now be desired to circulate fresh air through the system, lever 176 is moved to the position indicated C. When actuated to this position, door 150 will be moved to closed position and valve 140 to open position. Air will now enter the system through fresh air duct 14 and will flow upwardly through heating core 50 and then be directed either through distributing duct 110 or through take-off opening 114 or through both as desired. Should it be desired to increase the speed of operation of motor 80 when in this position it is only necessary to swing switch operating lever 264 about its pivot as previously described causing spring 280 to bring contact arm 274 into contact with contact 308. The resistance 300 is now short circuited and, consequently, the speed of the operation of the motor increases correspondingly. In the event that it should be desired to cause the fresh air to pass directly into the passenger compartment of the vehicle, lever 176 is moved to the position indicated D thereby causing valve 140 to remain open and door 150 to be opened by the mechanism previously described. Fresh air is now directed directly into the passenger compartment of the vehicle. When lever 176 is moved to the position indicated D, contact arm 274 is moved out of contact with the fixed contact elements of switch 276 by the engagement of lever 270 with finger 312, as previously described, thereby interrupting the circuit to the motor 80.

For convenience in operating levers 176, 178, 180, and 264, suitable knobs or handles 340, 342, 344, and 346, respectively, may be provided at the outer ends thereof and secured thereto in any suitable manner as, for example, by machine screws 348.

In order to retain lever 176 in its different positions of adjustment, a detent 350 is provided thereon which is adapted to yieldingly engage recesses indicated at 352, 354, 356, and 358 in a spring plate 360 opposite, respectively, the lever positions indicated A, B, C, and D. Similar securing means may be provided for the other levers 178 and 180 if it is so desired. As shown in Fig. 6, suitable legends may be provided on plate 188 opposite the levers 176, 178, 180 such as (Fan air), (Def.), (Temp.), respectively, indicating control of the air and the fan or blower, defrosting, and temperature. Legends such as (Off), (Inside air), (Outside air), and (Vent), may also be placed on plate 188 opposite positions indicated A, B, C, and D, respectively, to indicate the type of operation being effected by the apparatus.

From the foregoing description it is seen that a simplified and highly useful heating, ventilating, and windshield defroster apparatus has been provided. While but a single embodiment of the invention has been herein described, it is apparent that it may be embodied in other forms without departing from the spirit of the invention. It therefore is to be understood that it is not intended to limit the invention to the single embodiment disclosed but only by the scope of the claims which follow.

What is claimed is:

1. Apparatus of the character described, comprising, a casing having an opening through which fresh air may enter, a second opening through which air to be recirculated may enter and one or more discharge openings, a first closure for said first mentioned inlet opening, a second closure for said second inlet opening, a heating core mounted within said casing through which the air entering said casing may pass before discharging from the latter, lever means movable to different positions of adjustment, and means connecting each of said closures to said lever means, said closures and connecting means being so constructed and arranged that when said lever means is in one position said first closure is closed and said second closure is open, when in a second position said second closure is closed and said first closure is open, when in a third position both of said closures are open, a blower for inducing air flow through said casing, a motor for operating said blower, switch means for controlling the operation of said motor, a switch operating lever pivotally mounted on said lever means for closing said switch means when said lever means is in said first and second positions of adjustment to energize said motor, and motor speed control means associated with said switch operable by said switch operating lever to change the speed of said motor when said lever means is in said first and second positions of adjustment.

2. Apparatus of the character described, comprising, a casing having an opening through which fresh air may enter, a second opening through which air to be recirculated may enter and one or more discharge openings, a first closure for said first mentioned inlet opening, a second closure for said second inlet opening, a heating core mounted within said casing through which the air entering said casing may pass before discharging from the latter, lever means movable to different positions of adjustment, and means connecting each of said closures to said lever means, said closures and connecting means being so constructed and arranged that when said lever means is in one position said first closure is closed and said second closure is open, when in a second position said second closure is closed and said first closure is open, when in a third position both of said closures are open, a blower for inducing air flow through said casing, an electric motor for operating said blower, adjustable switch means for controlling the speed and operation of said electric motor, and adjustable means movable with said lever means for actuating said switch, said adjustable means being movable to adjust said switch to effect changes in the speed of said motor and to open said switch to de-energize said motor circuit when said lever means is in said first and second mentioned positions of adjustment, and to open said switch when said lever means is in other positions of adjustment.

3. Apparatus of the character described, comprising, a casing having an opening through which fresh air may enter, a second opening through which air to be recirculated may enter and one or more discharge openings, a first closure for said first mentioned inlet opening, a second closure for said second inlet opening, a heating core mounted within said casing through which the air entering said casing may pass before discharging from the latter, lever means movable to different positions of adjustment, and means connecting each of said closures to said lever means, said closures and connecting means being so constructed and arranged that when said lever means is in one position said first closure is closed and said second closure is open, when in a second position said second closure is closed and said first closure is open, when in a third position both of said closures are open, a blower for inducing air flow through said casing, an electric motor for operating said blower, adjustable switch means for controlling the speed and operation of said electric motor, and adjustable means movable with said lever means for actuating said switch, said adjustable means being movable to adjust said switch to effect changes in the speed of said motor and to open said switch to de-energize said motor circuit when said lever means is in said first and second mentioned positions of adjustment, to open said switch when said lever means is in other positions of adjustment, valve means associated with said discharge openings to control the discharge of air therethrough, a lever disposed adjacent said lever means for actuating said valve to open and closed positions, means for circulating a heating fluid through said heating core, thermostatically controlled valve means for controlling the flow of said heating fluid through said core, and a third lever disposed adjacent said lever means and first mentioned lever for controlling the operation of said thermostatically controlled valve means.

4. Apparatus of the stated character, comprising, a casing having a fresh air inlet opening, a recirculating air inlet opening and one or more discharge openings, a first closure for said first mentioned inlet opening, a second closure for said second inlet opening, a heating core disposed between said inlet and discharge openings, a blower disposed between said core and a discharge opening for inducing the flow of air through said casing, a motor for operating said blower, an electric circuit including adjustable switch means for controlling the speed and operation of said motor, and operating means for operating said first and second closures in a predetermined sequential order and for controlling the operation of said motor including lever means, mechanical connecting means between said lever means and said first and second closures, and additional connecting means between said lever means and switch means, said operating means when in one position causing closing of said first closure, opening of said second closure and opening of said switch to interrupt the circuit to said motor, when in a second position causing said first closure to remain in closed position and movement of said second closure slightly toward closed position and closing said switch thereby inducing flow of recirculated air through said casing by said blower, when in a third position causing opening of said first closure and closing of said second closure and closing of said switch thereby inducing the flow of fresh air through said casing by said blower; and when in a fourth position causing both of said closures to move to open position and opening of said switch thereby permitting fresh air to by-pass said heating core and discharge directly through said second inlet opening.

5. Apparatus of the stated character, comprising, a casing having a fresh air inlet opening, a recirculating air inlet opening and one or more discharge openings, a first closure for said first mentioned inlet opening, a second closure for said second inlet opening, a heating core disposed between said inlet and discharge openings, a blower disposed between said core and a discharge opening for inducing the flow of air through said casing, a motor for operating said blower, an electric circuit including adjustable switch means for controlling the speed and operation of said motor, and operating means for operating said first and second closures in a predetermined sequential order and for controlling the operation of said motor including lever means, mechanical connecting means between said lever means and said first and second closures, and additional connecting means between said switch means and said lever means, said operating means when in one position causing closing of said first closure, opening of said second closure and opening of said switch to interrupt the circuit to said motor, when in a second position causing said first closure to remain in closed position and movement of said second closure slightly toward closed position and closing said switch thereby inducing flow of recirculated air through said casing by said blower, when in a third position causing opening of said first closure and closing of said second closure and closing of said switch thereby inducing the flow of fresh air through said casing by said blower; and when in a fourth position causing both of said closures to move to open position and opening of said switch thereby permitting fresh air to by-pass said heating core and discharge directly through said second inlet opening, and said lever means including means for adjusting said switch to increase the speed of said motor and to interrupt the operation thereof when said lever means is in said second and third positions of adjustment.

6. Apparatus of the stated character, comprising, a casing having a fresh air inlet opening, a recirculating air inlet opening and one or more discharge openings, a first closure for said first mentioned inlet opening, a second closure for said second inlet opening, a heating core disposed between said inlet and discharge openings, a blower disposed between said core and a discharge opening for inducing the flow of air through said casing, a motor for operating said blower, an electric circuit including adjustable switch means for controlling the speed and operation of said motor, and operating means for operating said first and second closures in a predetermined sequential order and for controlling the operation of said motor including lever means, mechanical connecting means between said lever means and said first and second closures, and additional connecting means between said switch means and said lever means, said operating means when in one position causing closing of said first closure, opening of said second closure and opening of said switch to interrupt the circuit to said motor, when in a second position causing said first closure to remain in closed position and movement of said second closure slightly toward closed position and closing said switch thereby inducing flow of recirculated air through said casing by said blower, when in a third position causing opening of said first closure and closing of said second closure and closing of said switch thereby inducing the flow of fresh air through said casing by said blower; and when in a fourth position causing both of said closures to move to open position and opening of said switch thereby permitting fresh air to by-pass said heating core and discharge directly through said second inlet opening, said lever means including means for adjusting said switch to increase the speed of said motor and to interrupt the operation thereof when said lever means is in said second and third positions of adjustment, valve means for controlling the air flow through said discharge openings, a lever for actuating said valve to open and closed position, heating fluid circulating means for said heating core, valve means for controlling the flow of said heating fluid through said core, and a lever for controlling the operation of said last mentioned valve.

References Cited in the file of this patent

UNITED STATES PATENTS

| 2,235,642 | Lintern et al. | Mar. 18, 1941 |
| 2,249,946 | Darrah et al. | July 22, 1941 |
| 2,295,750 | Norris et al. | Sept. 15, 1942 |
| 2,304,643 | Hans | Dec. 8, 1942 |
| 2,306,796 | Staley et al. | Dec. 29, 1942 |
| 2,391,408 | Galamb et al. | Dec. 25, 1945 |
| 2,488,278 | Findley | Nov. 15, 1949 |
| 2,544,465 | Matulaitis | Mar. 6, 1951 |
| 2,605,688 | Hezler, Jr. | Aug. 5, 1952 |
| 2,612,829 | Joyce | Oct. 7, 1952 |
| 2,627,218 | Katz | Feb. 3, 1953 |
| 2,631,517 | Duhn | Mar. 17, 1953 |
| 2,634,670 | Simons | Apr. 14, 1953 |